US010455559B2

(12) United States Patent
Fodor et al.

(10) Patent No.: US 10,455,559 B2
(45) Date of Patent: Oct. 22, 2019

(54) LICENSE ASSISTED LISTEN-BEFORE-TALK

(71) Applicant: Telefonaktiebolaget LM Ericsson (publ), Stockholm (SE)

(72) Inventors: Gabor Fodor, Hässelby (SE); Bo Lincoln, Lund (SE); Håkan Björkegren, Täby (SE); Jonas Kronander, Knivsta (SE); Anders Wallén, Ystad (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 91 days.

(21) Appl. No.: 15/533,790

(22) PCT Filed: Oct. 31, 2016

(86) PCT No.: PCT/SE2016/051066
§ 371 (c)(1),
(2) Date: Jun. 7, 2017

(87) PCT Pub. No.: WO2018/080366
PCT Pub. Date: May 3, 2018

(65) Prior Publication Data
US 2018/0332575 A1 Nov. 15, 2018

(51) Int. Cl.
*H04W 72/04* (2009.01)
*H04W 74/08* (2009.01)
(Continued)

(52) U.S. Cl.
CPC ..... *H04W 72/0413* (2013.01); *H04W 74/004* (2013.01); *H04W 74/02* (2013.01);
(Continued)

(58) Field of Classification Search
CPC ............... H04W 74/02; H04W 74/004; H04W 72/0413; H04W 74/0833
See application file for complete search history.

(56) References Cited

U.S. PATENT DOCUMENTS 7,843,819 B1 * 11/2010 Benveniste ........... H04L 1/1861
370/230
2011/0249659 A1 * 10/2011 Fontaine ............... H04L 1/1607
370/338
(Continued)

OTHER PUBLICATIONS

R1-151106 "Hidden Node Problem and Potential Remedies for LAA Downlink"; 3GPP TSG RAN WG1 Meeting Ad-Hoc; Paris, France; Mar. 24, 2015. (Year: 2015).*
(Continued)

Primary Examiner — Benjamin H Elliott, IV
(74) Attorney, Agent, or Firm — Withrow & Terranova, PLLC

(57) ABSTRACT

Systems and methods are disclosed herein that relate to the use of signals in a licensed spectrum to assist with determining a status of an unlicensed channel(s) in an unlicensed spectrum. In some embodiments, a method of operation of a wireless device in a wireless system in which the wireless device transmits and/or receives in both a licensed spectrum and an unlicensed spectrum comprises attempting to detect a busy indication transmitted in the licensed spectrum. The busy indication is an indication that another wireless device is transmitting in the unlicensed spectrum. The method further comprises determining whether to transmit in the unlicensed spectrum based on whether the wireless device has detected a busy indication transmitted in the licensed spectrum. By using signals in the licensed spectrum, the hidden node problem and/or the exposed node problem in the unlicensed spectrum can be mitigated.

22 Claims, 11 Drawing Sheets

(51) Int. Cl.
*H04W 74/00* (2009.01)
*H04W 74/02* (2009.01)

(52) U.S. Cl.
CPC ... *H04W 74/0833* (2013.01); *H04W 74/0866* (2013.01); *H04W 74/0816* (2013.01)

(56) References Cited

U.S. PATENT DOCUMENTS

| | | | | |
|---|---|---|---|---|
| 2016/0095009 A1* | 3/2016 | Ling | ................ | H04W 16/14 370/329 |
| 2016/0227578 A1* | 8/2016 | Lee | ................ | H04W 74/004 |
| 2017/0055193 A1* | 2/2017 | Mueck | ............ | H04W 72/1215 |
| 2017/0079054 A1* | 3/2017 | Yan | ................ | H04W 72/14 |
| 2017/0142743 A1* | 5/2017 | Yoon | ................ | H04L 5/0048 |
| 2017/0279565 A1* | 9/2017 | Han | ................ | H04L 1/1877 |
| 2017/0339696 A1* | 11/2017 | Xu | ................ | H04W 48/16 |
| 2018/0279211 A1* | 9/2018 | Lunttila | ............ | H04W 48/16 |
| 2018/0332575 A1* | 11/2018 | Fodor | ............ | H04W 74/0866 |

OTHER PUBLICATIONS

Author Unknown, "Exposed Node Problem," Wikipedia.org, Available online at: <<https://web.archive.org/web/20160122210704/https://en.wikipedia.org/wiki/Exposed_node_problem>>, Jan. 22, 2016, Accessed by the International Searching Authority Jul. 12, 2017, 3 pages.

Intel Corporation, "R1-150504: Hidden Node Problem and Potential Remedies for LAA Downlink," Third Generation Partnership Project (3GPP) TSG RAN WG1 Meeting #80, Feb. 9-13, 2015, Athens, Greece, 3 pages.

International Search Report and Written Opinion for International Patent Application No. PCT/SE2016/051066, dated Jul. 19, 2017, 11 pages.

* cited by examiner

LICENSE ASSISTED LISTEN-BEFORE-TALK

This application is a 35 U.S.C. § 371 national phase filing of International Application No. PCT/SE2016/051066, filed Oct. 31, 2016, the disclosure of which is incorporated herein by reference in its entirety.

TECHNICAL FIELD

The present disclosure relates to wireless communication in an unlicensed spectrum and, in particular, to augmenting Clear Channel Assessment (CCA), or Listen-Before-Talk (LBT), with a busy indication transmitted in a licensed spectrum to, e.g., address the hidden node problem and/or the exposed node problem.

BACKGROUND

Listen-Before-Talk (LBT) and Carrier Sense Multiple Access (CSMA)

In wireless networks operating in unlicensed spectrum, multiple nodes may access the wireless medium simultaneously without the arbitration of a central entity. In such situations, a distributed Medium Access Control (MAC) mechanism can help the wireless nodes to coordinate the access and provide an arbitration mechanism such that each node can transmit its packet with low probability of packet collisions. Examples of such mechanisms are the CSMA and LBT protocols employed by wireless technologies operating in unlicensed spectrum.

For Long Term Evolution (LTE) systems deployed in unlicensed spectrum, using the LBT protocol enables coexistence with, for example, IEEE wireless networks, i.e., WiFi networks using CSMA based MAC. LTE systems employing LBT do not degrade the performance of the IEEE system more than if an additional IEEE network was deployed in the same frequency band. Thus, LBT and CSMA are important mechanisms in environments of mixed wireless technologies.

A well-known problem associated with CSMA and LBT protocols is the hidden node problem illustrated in FIG. 1. The hidden node problem may lead to packet collisions at the receiver and thereby throughput degradations and instability of the system. In the illustrated example, a first User Equipment device (UE-A) has an ongoing transmission in the unlicensed band. A second UE (UE-B) is far enough from UE-A that UE-B does not sense the transmission of UE-A when performing CSMA/LBT and, as such, UE-B also begins transmitting in the unlicensed band. As a result, there is packet collision at the intended receiver, which results in a degradation in throughput and instability of the system.

Another problem in CSMA and LBT systems is the so called exposed node problem illustrated in FIG. 2. An exposed node senses the channel busy when it is close to a wireless transmitter and refrains from transmission even when its intended receiver node is interference free. In the illustrated example, there is an ongoing transmission from UE-A to base station A (BS-A) in the unlicensed band. UE-B desires to transmit in the unlicensed band to BS-B. However, during CSMA/LBT, UE-B detects the transmission from UE-A (i.e., senses energy in the channel) and therefore determines that the channel is busy. However, this is an undesirable result because the intended receiver for UE-B is different than the intended receiver for the transmission from UE-A. In other words, UE-B could have transmitted to BS-B in the unlicensed band without causing interference to the transmission from UE-A to BS-A.

A consequence of the hidden and exposed node problems is a throughput degradation due to retransmissions and delayed transmissions. Also, the overall load in terms of transmitted packets and served UEs that the system can handle without diverging packet delivery times can be severely degraded. Recognizing the importance of solving the hidden and exposed node problems, existing technologies provide wireless protocols such as, e.g., those based on Ready to Send (RTS) and Clear to Send (CTS) signaling that help mitigate these problems at the expense of extra complexity and protocol overhead.

License Assisted Access (LAA) in Unlicensed Spectrum

Currently, unlicensed frequency bands provide the possibility to enhance the capacity of cellular networks operating solely in licensed bands. To this end, existing and currently standardized technologies such as Third Generation Partnership Project (3GPP) LTE-Unlicensed (LTE-U) and LAA provide mechanisms by means of which LTE UEs can access the unlicensed spectrum bands without implementing IEEE technologies. Such UEs must adhere to regulations that facilitate the coexistence of 3GPP and IEEE technologies in the same frequency bands. UEs implementing LAA and LTE-U protocols must comply with various regulatory requirements concerning the employed duty cycle, transmit power levels, and medium access mechanisms, such as carrier sensing and Clear Channel Assessment (CCA) so that a fair sharing of the wireless medium by multiple technologies is achieved.

The primary objective of LTE-U and LAA technologies is increasing the capacity in scenarios in which LTE networks operating in licensed bands are deployed. Public indoor deployments, outdoor hotspots, or corporate environments, for example, can benefit from such capacity enhancements.

Problems With Existing Solutions

CSMA/LBT schemes, which are generally referred to herein as CCA schemes, are needed for cellular communications networks such as LTE-U and/or LAA networks operating in unlicensed frequency bands. However, current CCA schemes still suffer from the hidden node and exposed node problems. As such, there is a need for systems and methods that address the hidden node problem and/or the exposed node problem, particularly in a cellular communications system that utilizes unlicensed spectrum.

SUMMARY

Systems and methods are disclosed herein that relate to the use of signals in a licensed spectrum to assist with determining a status of an unlicensed channel(s) in an unlicensed spectrum. In some embodiments, a method of operation of a wireless device in a wireless system in which the wireless device transmits and/or receives in both a licensed spectrum and an unlicensed spectrum comprises attempting to detect a busy indication transmitted in the licensed spectrum. The busy indication is an indication that another wireless device is transmitting in the unlicensed spectrum. The method further comprises determining whether to transmit in the unlicensed spectrum based on whether the wireless device has detected a busy indication transmitted in the licensed spectrum. By using signals in the licensed spectrum, the hidden node problem and/or the exposed node problem in the unlicensed spectrum can be mitigated. In doing so, both throughput and stability in the unlicensed spectrum can be achieved.

In some embodiments, the method further comprises, upon determining to transmit in the unlicensed spectrum, transmitting in the unlicensed spectrum.

In some embodiments, attempting to detect a busy indication transmitted in the licensed spectrum comprises attempting to detect a busy indication transmitted in the licensed spectrum by a serving radio access node of the wireless device. In other embodiments, attempting to detect a busy indication transmitted in the licensed spectrum comprises attempting to detect a busy indication transmitted in the licensed spectrum by another wireless device. In some other embodiments, attempting to detect a busy indication transmitted in the licensed spectrum comprises attempting to detect both a busy indication transmitted in the licensed spectrum by a serving radio access node of the wireless device and a busy indication transmitted in the licensed spectrum by another wireless device.

In some embodiments, the method further comprises performing a Clear Channel Assessment (CCA) for a channel in the unlicensed spectrum. Still further, determining whether to transmit in the unlicensed spectrum comprises determining to transmit in the unlicensed spectrum upon determining that the wireless device has not detected a busy indication transmitted in the licensed spectrum and determining that the channel in the unlicensed spectrum is clear as a result of performing the CCA for the channel in the unlicensed spectrum.

In some embodiments, determining whether to transmit in the unlicensed spectrum based on whether the wireless device has detected a busy indication transmitted in the licensed spectrum comprises determining that the wireless device has detected a busy indication transmitted in the licensed spectrum, determining that the detected busy indication is a busy indication transmitted in the licensed spectrum by another wireless device, and determining whether the wireless device has also detected a busy indication transmitted in the licensed spectrum by a serving radio access node of the wireless device. The wireless device determines to transmit in the unlicensed spectrum upon determining that the wireless device has not also detected a busy indication transmitted in the licensed spectrum by the serving radio access node of the wireless device.

In some embodiments, determining whether to transmit in the unlicensed spectrum based on whether the wireless device has detected a busy indication transmitted in the licensed spectrum comprises determining that the wireless device has detected a busy indication transmitted in the licensed spectrum, determining that the detected busy indication is a busy indication transmitted in the licensed spectrum by another wireless device, decoding the busy indication to obtain an identifier of an intended recipient of the transmission in the unlicensed spectrum by the other wireless device, and determining whether the intended recipient is a serving radio access node of the wireless device. The wireless device determines to transmit in the unlicensed spectrum upon determining that the intended recipient is not the serving radio access node of the wireless device.

In some embodiments, the method further comprises, upon determining to transmit in the unlicensed spectrum, transmitting a busy indication in the licensed spectrum to the serving radio access node of the wireless device. Further, in some embodiments, transmitting the busy indication comprises transmitting the busy indication using a scheduled resource in the licensed spectrum. In some other embodiments, transmitting the busy indication comprises transmitting the busy indication using a preconfigured channel in the licensed spectrum. In some other embodiments, transmitting the busy indication comprises transmitting the busy indication in an uplink channel in an uplink spectrum of a cellular communications network, the cellular communications network comprising the serving radio access node. In some other embodiments, transmitting the busy indication comprises transmitting the busy indication using resources designated for Device-to-Device (D2D) traffic.

In some embodiments, the transmitted busy indication is a message comprising an indication of a resource in the unlicensed spectrum on which the wireless device is transmitting.

In some embodiments, the unlicensed spectrum is logically divided into a plurality of channels, and the transmitted busy indication is a message comprising an indication of one or more channels in the unlicensed spectrum in which the wireless device is transmitting.

In some embodiments, the transmitted busy indication is a message comprising an indication of an intended recipient of the transmission by the wireless device in the unlicensed spectrum.

Embodiments of a wireless device for a wireless system in which the wireless device transmits and/or receives in both a licensed spectrum and an unlicensed spectrum are also disclosed. In some embodiments, the wireless device is adapted to attempt to detect a busy indication transmitted in the licensed spectrum, the busy indication being an indication that another wireless device is transmitting in the unlicensed spectrum. The wireless device is further adapted to determine whether to transmit in the unlicensed spectrum based on whether the wireless device has detected a busy indication transmitted in the licensed spectrum and, upon determining to transmit in the unlicensed spectrum, transmit in the unlicensed spectrum. In some embodiments, the wireless device is further adapted to operate according to any one of the embodiments of the method operation of a wireless device disclosed herein.

In some embodiments, a wireless device for a wireless system in which the wireless device transmits and/or receives in both a licensed spectrum and an unlicensed spectrum comprises a transceiver, at least one processor, and memory comprising instructions executable by the at least one processor whereby the wireless device is operable to operate as follows. The wireless device is operable to attempt to detect a busy indication transmitted in the licensed spectrum. The busy indication is an indication that another wireless device is transmitting in the unlicensed spectrum. The wireless device is further operable to determine whether to transmit in the unlicensed spectrum based on whether the wireless device has detected a busy indication transmitted in the licensed spectrum and, upon determining to transmit in the unlicensed spectrum, transmit in the unlicensed spectrum.

In some embodiments, a wireless device for a wireless system in which the wireless device transmits and/or receives in both a licensed spectrum and an unlicensed spectrum comprises a detecting module, a determining module, and a transmitting module. The detecting module is operable to attempt to detect a busy indication transmitted in the licensed spectrum. The busy indication is an indication that another wireless device is transmitting in the unlicensed spectrum. The determining module is operable to determine whether to transmit in the unlicensed spectrum based on whether the wireless device has detected a busy indication transmitted in the licensed spectrum. The transmitting module is operable to, upon determining to transmit in the unlicensed spectrum, transmit in the unlicensed spectrum.

Embodiments of a method of operation of a radio access node in a wireless system are also disclosed. In some embodiments, the method of operation of a radio access node in a wireless system comprises receiving a first busy indication in a licensed spectrum from a wireless device. The first busy indication is an indication that the wireless device is transmitting in an unlicensed spectrum. The method further comprises transmitting a second busy indication in a licensed spectrum indication in response to receiving the first busy indication. The second busy indication being an indication that the wireless device is transmitting in the unlicensed spectrum.

In some embodiments, the second busy indication comprises at least one of a group consisting of: a parameter that is indicative of a validity of the second busy indication, an indication of an angle of arrival of the first busy indication at the radio access node, and an indication of one or more channels in the unlicensed spectrum in which the wireless device is transmitting.

In some embodiments, the first busy indication comprises at least one of a group consisting of: an indication of a resource in the unlicensed spectrum on which the wireless device is transmitting and an indication of one or more channels in the unlicensed spectrum in which the wireless device is transmitting.

In some embodiments, transmitting the second busy indication comprises transmitting the second busy indication using a scheduled resource in the licensed spectrum. In some other embodiments, transmitting the second busy indication comprises transmitting the second busy indication using a preconfigured channel in the licensed spectrum. In some other embodiments, transmitting the second busy indication comprises transmitting the second busy indication in a downlink channel in a downlink spectrum of a cellular communications network, the cellular communications network comprising the radio access node.

Embodiments of a radio access node for a wireless system are also disclosed. In some embodiments, a radio access node for a wireless system is adapted to receive a first busy indication in a licensed spectrum from a wireless device. The first busy indication is an indication that the wireless device is transmitting in an unlicensed spectrum. The radio access node is further adapted to transmit a second busy indication in a licensed spectrum indication in response to receiving the first busy indication. The second busy indication is an indication that the wireless device is transmitting in an unlicensed spectrum. In some embodiments, the radio access node is further adapted to operate according to any one of the embodiments of the method of operation of a radio access node described herein.

In some embodiments, a radio access node for a wireless system comprises at least one radio unit, at least one processor, and memory comprising instructions executable by the at least one processor whereby the radio access node is operable to receive a first busy indication in a licensed spectrum from a wireless device where the first busy indication is an indication that the wireless device is transmitting in an unlicensed spectrum and transmit a second busy indication in a licensed spectrum indication in response to receiving the first busy indication where the second busy indication is an indication that the wireless device is transmitting in an unlicensed spectrum.

In some embodiments, a radio access node for a wireless system comprises a receiving module and a transmitting module. The receiving module is operable to receive a first busy indication in a licensed spectrum from a wireless device. The first busy indication is an indication that the wireless device is transmitting in an unlicensed spectrum. The transmitting module is operable to transmit a second busy indication in a licensed spectrum indication in response to receiving the first busy indication. The second busy indication is an indication that the wireless device is transmitting in an unlicensed spectrum.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
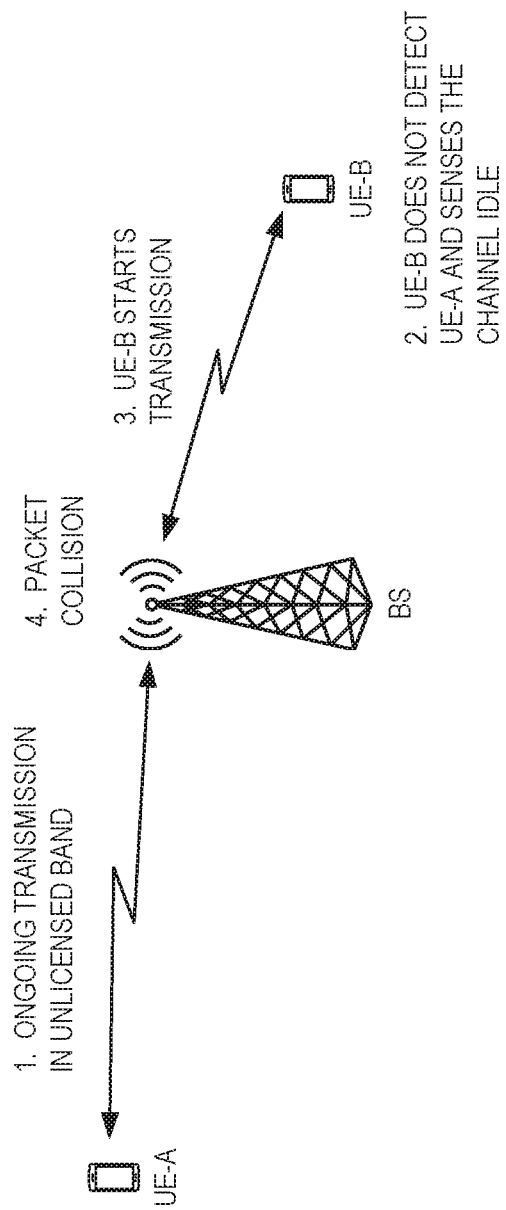
FIG. 1 illustrates the hidden node problem.
Figure 2:
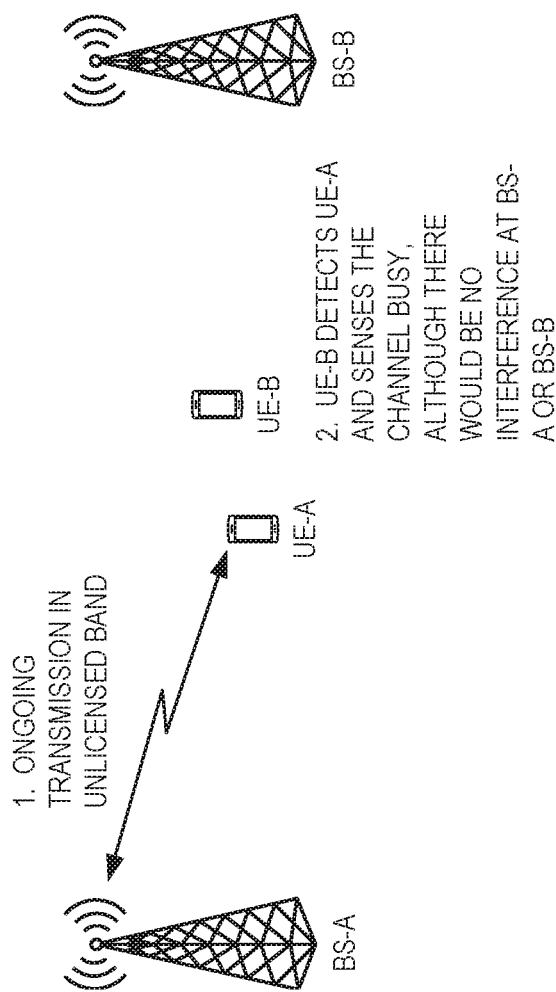
FIG. 2 illustrates the exposed node problem.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

The present disclosure relates to scenarios in which a cellular communications network (e.g., an LTE network) operates in licensed spectrum bands and capacity enhancement is provided by utilizing unlicensed spectrum resources. In some embodiments, operation in the unlicensed spectrum is provided using 3GPP LTE in the unlicensed band (LTE-U) or License Assisted Access (LAA) technology. LTE-U enables standalone operation in unlicensed spectrum whereas LAA enables operation in the unlicensed band using Carrier Aggregation (CA) with, e.g., a Primary Cell (PCell) in a licensed band and one or more Secondary Cells (SCells) in an unlicensed band. The description provided herein focuses on the case where UEs implement a Clear Channel Assessment (CCA) scheme (e.g., Carrier Sensing (CS) or Listen-Before-Talk (LBT)) before transmitting in an unlicensed band, but it is easily understood by the skilled person that the concepts disclosed herein are applicable when radio access nodes, or more generally wireless access points, use a CCA scheme before transmitting in an unlicensed band.

To comply with regulations and achieve high throughput, UEs use a CCA scheme such as, e.g., a Carrier Sense Multiple Access (CSMA) or LBT medium access protocol before transmitting in an unlicensed band and have capabilities and access rights to spectrum resources licensed to a cellular communications network such as, e.g., an LTE network. In other words, embodiments disclosed herein are applicable in situations in which UEs have multiple Radio Access Technology (multi-RAT) capability, i.e., the UEs have the capability to access both licensed and unlicensed spectrum.

Embodiments are described herein that relate to the use of signals in the licensed spectrum to exchange information about the status of an unlicensed channel(s) in an unlicensed spectrum. The signals in the licensed spectrum assist UEs in determining whether the UEs can access the unlicensed channel(s) without causing packet collisions at their intended receivers. Embodiments of the present disclosure take advantage of the capability of transmitting and receiving signals in licensed spectrum to assist transmission in unlicensed spectrum and mitigate the problems of hidden and exposed nodes. Note that while the embodiments described herein focus on the use of signals in the licensed spectrum, these signals may alternatively be transmitted in a dedicated channel(s) in an unlicensed spectrum that do not require CCA.

Figure 3:
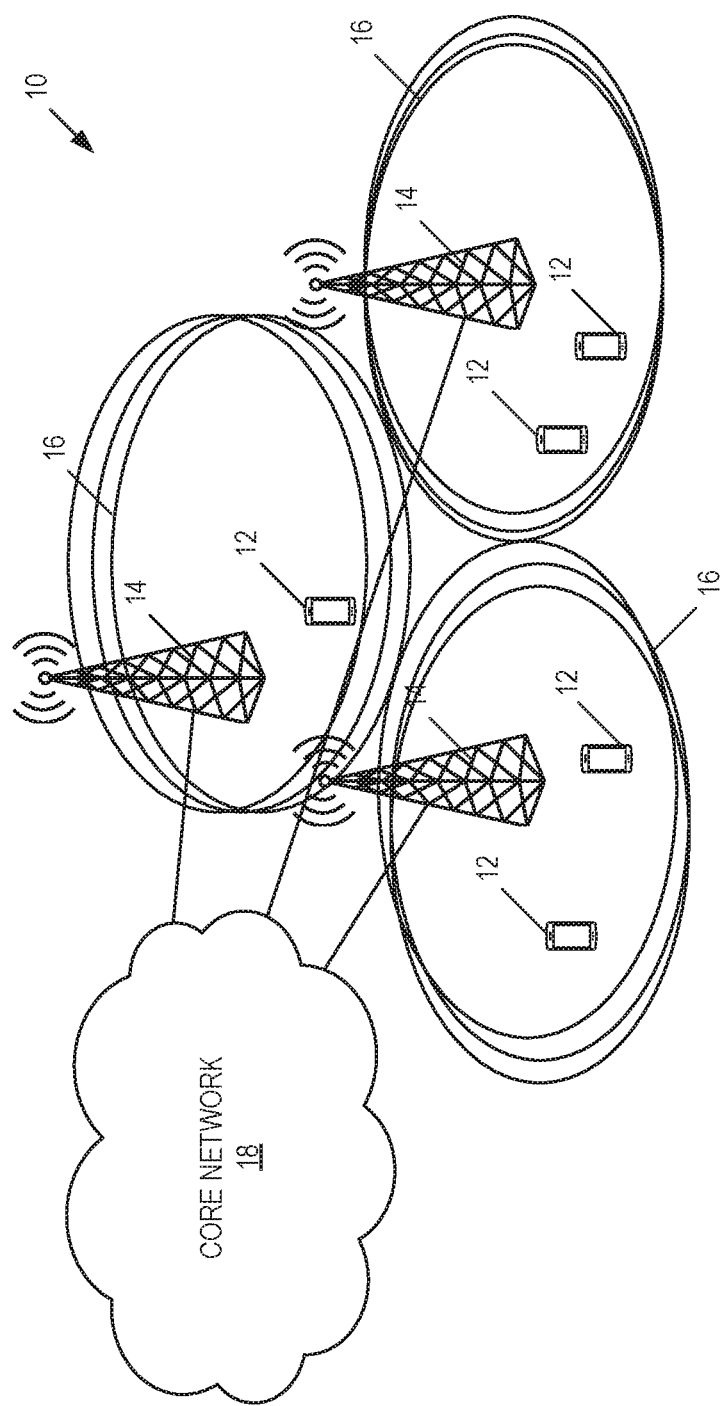
FIG. 3 illustrates one example of a cellular communications network, or more generally a wireless system, in which embodiments of the present disclosure may be implemented.

In this regard, FIG. 3 illustrates one example of a cellular communications network 10, or more generally a wireless system, in which embodiments of the present disclosure may be implemented. As illustrated, a number of UEs 12, or more generally wireless devices, wirelessly transmit signals to and receive signals from base stations 14 (e.g., eNBs), or more generally radio access nodes, each serving one or more cells 16. The base stations 14 are connected to a core network 18. The base stations 14 each serve one or more cells 16. The cells 16 include cells 16 operating in licensed spectrum as well as cells 16 operating in unlicensed spectrum. For example, for LAA, a base station 14 may serve one or more cells 16 in licensed spectrum and one or more cells in unlicensed spectrum, where, for a particular UE 12, one of the cells 16 is configured as the PCell of the UE 12, one or more other cells 16 in the licensed spectrum may be configured as SCells of the UE 12, and one or more of the cells 16 in the unlicensed spectrum may be configured as an SCell of the UE 12. For LTE-U and similar technologies such as MulteFire, both the PCell and any SCells of the UE 12 operate in the unlicensed spectrum.

As described below in detail, according to embodiments of the present disclosure, a UE 12 transmits a busy indication in the licensed spectrum (i.e., in a licensed band) that indicates that the UE 12 is transmitting on one or more channels in the unlicensed spectrum (i.e., in an unlicensed band). In other words, the UE 12 indicates that it is using the unlicensed spectrum for packet transmission. Note that the terms "licensed spectrum" and "licensed band" are used interchangeably herein. Likewise, the terms "unlicensed spectrum" and "unlicensed band" are used interchangeably herein. The busy indication transmitted by the UE 12 in the licensed spectrum is referred to herein as a U-BUSY signal. The UE 12 transmits the U-BUSY signal in the licensed spectrum to its serving base station 14, e.g., in a scheduled uplink transmission. In some embodiments, the unlicensed spectrum is logically divided into two or more unlicensed channels, in which case the U-BUSY signal indicates which unlicensed channel(s) in the unlicensed spectrum are busy. In other embodiments, the unlicensed spectrum can be viewed as a single unlicensed channel such that the U-BUSY signal is an indication that the unlicensed channel is busy. Upon receiving the U-BUSY signal, the base station 14 transmits (e.g., broadcasts) another busy indication in the licensed spectrum within its coverage area. This busy indication transmitted by the base station 14 is referred to herein as a DL-U-BUSY signal. The DL-U-BUSY signal enables other UEs 12 in its coverage area to determine when the unlicensed channel(s) in the unlicensed spectrum is busy even when their local CCA protocol (e.g., local LBT protocol) does not sense the unlicensed channel(s) as being busy due to, e.g., the hidden node problem.

Figure 4:
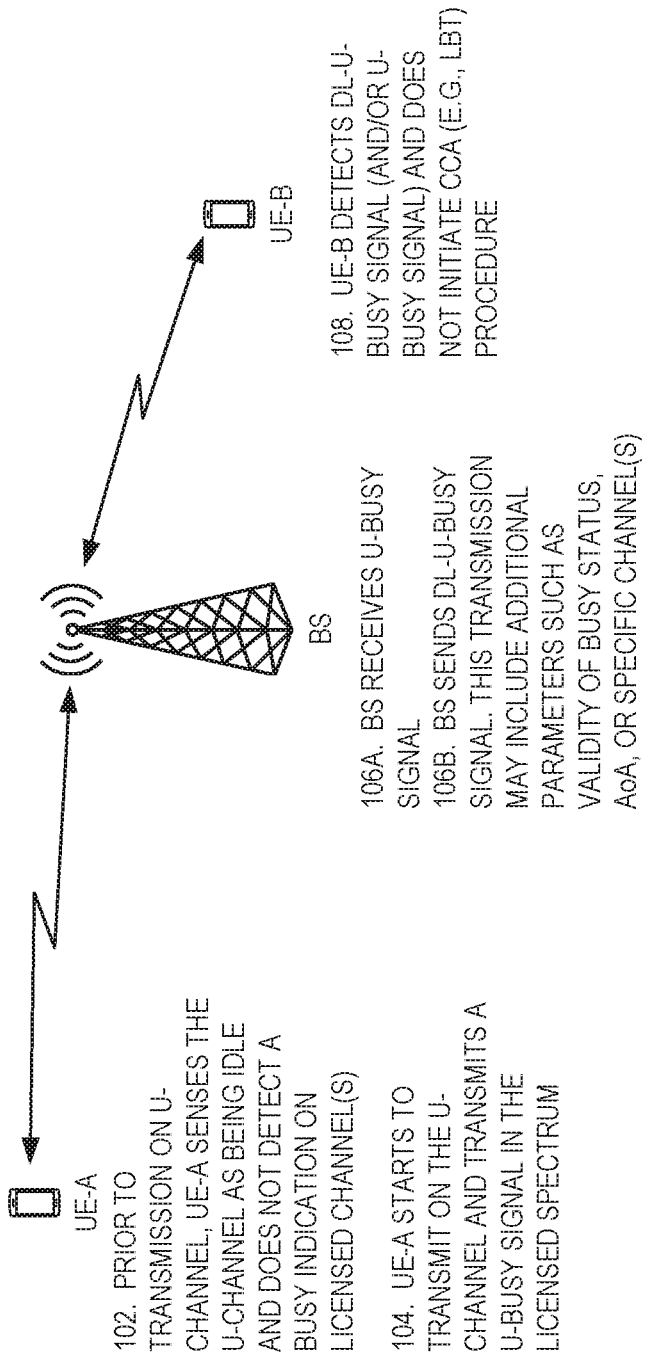
FIG. 4 illustrates the operation of the system of FIG. 3 according to some embodiments of the present disclosure.

In this regard, FIG. 4 illustrates the operation of two UEs 12, which are referred to as UE-A and UE-B, and a base station 14, which is referred to as base station (BS), according to some embodiments of the present disclosure. The operation of UE-A, UE-B, and BS as described herein provide a solution to the hidden node problem. In this example, the cellular communications network 10 is an LTE network such as an LTE network using LTE-U and/or LAA technology.

Preparation: The LTE network, which is operating in the licensed spectrum and employing scheduled access to the wireless medium in the licensed spectrum, reserves a specific downlink channel in the licensed spectrum to be used for broadcasting DL-U-BUSY signals (step 100A). This channel is referred to herein as the DL-U-BUSY channel. The DL-U-BUSY signals may include information about the status of the unlicensed spectrum or, in case the unlicensed spectrum is channelized, the status of the channels used in the unlicensed spectrum. Likewise, a specific uplink channel is reserved for transmitting U-BUSY signals (step 100B). This channel is referred to herein as the U-BUSY channel. The U-BUSY signals may include information about the status of the unlicensed spectrum/channel(s). In its simplest form, the status of an unlicensed spectrum/channel(s) is a single bit binary information per unlicensed channel, i.e., a bit that indicates whether or not the unlicensed channel is being used. Again, in scenarios where the unlicensed spectrum is not channelized, the unlicensed spectrum can be viewed as, and is thus referred to herein, a single unlicensed channel. In other embodiments, the status information may include other information about the estimated time the unlicensed channel will remain busy or the energy level detected on the unlicensed channel.

Medium access on an Unlicensed Channel(s): Prior to transmission on an unlicensed channel(s), a UE 12 checks the status of the unlicensed channel(s) indicated on the DL-U-BUSY channel. If it the UE 12 is capable of receiving uplink signals (e.g., the UE 12 is Device-to-Device (D2D)-capable), then the UE 12 may also check the status of the unlicensed channel(s) on the U-BUSY channel. In other words, the UE 12 attempts to detect a busy indication for the unlicensed channel(s). This may be done by checking the DL-U-BUSY channel for a DL-U-BUSY signal that indicates that the unlicensed channel(s) is busy. Optionally, in some embodiments, the UE 12 additionally or alternatively checks the U-BUSY channel for a U-BUSY signal that indicates that the unlicensed channel(s) is busy. In some embodiments, the DL-U-BUSY and U-BUSY signals may contain an indication of an intended receiver of the respective transmission in the unlicensed channel(s), in which case the UE 12 may also attempt to decode this information.

In this example, prior to transmission on the unlicensed channel(s), UE-A does not detect any busy indication transmitted in the licensed spectrum for the unlicensed channel(s), and UE-A senses the unlicensed channel(s) as being clear (also referred to herein as being idle) (step 102). Upon making this determination, UE-A starts transmitting on the unlicensed channel(s) and transmits a U-BUSY signal in the licensed spectrum on the U-BUSY channel (step 104). Alternatively, UE-A may initiate transmission on the unlicensed channel(s) if UE-A senses the unlicensed channel(s) as being clear and cannot decode the DL-U-BUSY and U-BUSY signals. The U-BUSY signal transmitted by UE-A includes an indication that the unlicensed channel(s) is busy, i.e., that UE-A is transmitting on the unlicensed channel(s) in the unlicensed spectrum. In some embodiments, UE-A requests a scheduled resource for transmitting the U-BUSY signal on the U-BUSY channel. In other embodiments, UE-A uses a preconfigured channel to transmit the U-BUSY signal on the specific licensed uplink channel.

When the BS receives a U-BUSY signal from any of the UEs 12 within its coverage area, the BS transmits a corresponding DL-U-BUSY signal using, e.g., a predefined downlink channel. In some embodiments, the BS broadcasts the DL-U-BUSY signal along with other parameters that, e.g., indicate an estimated (predicted) occupancy of the unlicensed channel(s), and, optionally an identifier of itself as the intended recipient of the respective transmission. This identifier may be, for example, a cell identity. In some embodiments, the BS may transmit the DL-U-BUSY signal when the BS starts receiving an uplink transmission in the unlicensed band or in an unlicensed channel from a served UE 12.

In the illustrated example, the BS receives the U-BUSY signal from UE-A (step 106A). Upon receiving the U-BUSY signal from UE-A, the BS sends, or transmits, a corresponding DL-U-BUSY signal in the licensed spectrum (step 106B). Again, the DL-U-BUSY signal includes an indication that the unlicensed channel(s) is busy, i.e., that a UE 12, which in this case is UE-A, is transmitting in the unlicensed spectrum. In addition, the DL-U-BUSY signal includes, in some embodiments, additional parameters such as, for example, a parameter that indicates a validity of the busy status, a parameter that indicates an Angle of Arrival (AoA) of the U-BUSY signal at the BS, and/or an indication of the specific unlicensed channel(s) within the unlicensed spectrum that are busy.

UE-B also desires to transmit in the unlicensed spectrum. However, UE-B detects the DL-U-BUSY signal and/or, in some embodiments, the U-BUSY signal and, in this embodiment, does not perform CCA (e.g., LBT) since the busy signal has been detected (step 108). As a result, in this example, UE-B refrains from transmitting on the unlicensed channel(s) in the unlicensed spectrum.

Steps 102 through 108 enable UE-B to determine with a higher probability whether a transmission in the unlicensed spectrum to the same intended receiver (i.e., the BS in the illustrated example) is ongoing than without the assisting signals U-BUSY and DL-U-BUSY. The main reason for this is two-fold. First, the U-BUSY signal transmitted in the licensed spectrum may be transmitted with a higher power than the transmit power used for the unlicensed transmission. For example, the typical maximum power in the unlicensed band allowed by regulations is often limited to 20 decibel-milliwatts (dBm), whereas UEs 12 are typically allowed to transmit with 23-24 dBm in the licensed uplink band. Second, the DL-U-BUSY signal transmitted by the BS in a predefined licensed channel has good coverage and can be decoded with high probability by served UEs 12.

The DL-U-BUSY signal and the U-BUSY signal can also be used to address the exposed node problem. In some embodiments, the U-BUSY signal includes an indication of an intended receiver of the respective transmission in the unlicensed spectrum. The indication of the intended receiver may be, for example, an identity of the cell or serving base station 14 for which the transmission is intended. The indication of the intended receiver enables other UEs 12 that receive the U-BUSY signal to determine the intended receiver of the transmission in the unlicensed spectrum. If a UE 12 detects a U-BUSY signal where the intended receiver indicated by the U-BUSY signal is not the same as the intended receiver for a desired transmission of the UE 12 in the unlicensed spectrum, then the UE 12 may initiate transmission in the unlicensed spectrum even if the unlicensed channel(s) is sensed as being busy, thereby addressing the exposed node problem.

In some other embodiments, the U-BUSY signal may or may not include an indication of the intended receiver of the respective transmission in the unlicensed spectrum. If a UE 12 detects a U-BUSY signal and also detects a DL-U-BUSY signal from its serving base station 14, then the UE 12 determines that the unlicensed spectrum, or the specific channel(s) in the unlicensed spectrum, are busy. However, if the UE 12 detects a U-BUSY signal but does not detect a DL-U-BUSY signal from its serving base station 14, the UE 12 determines that its serving base station 14 is not the intended recipient of the transmission that triggered the detected U-BUSY signal and, as such, determines that it can transmit in the unlicensed spectrum even if CCA senses the unlicensed channel(s) as busy.

Figure 5:
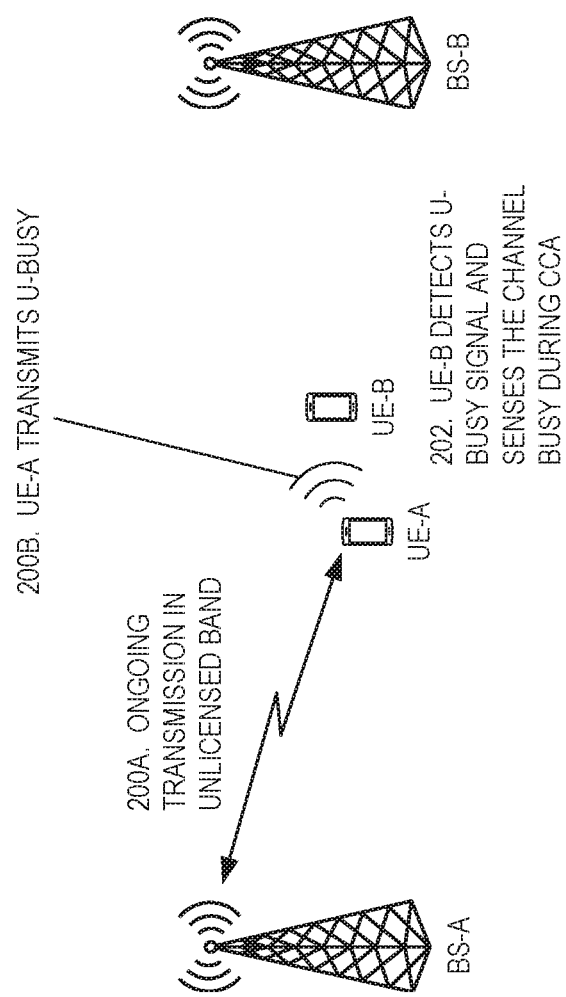
FIG. 5 illustrates the operation of the system of FIG. 3 according to some other embodiments of the present disclosure.

In this regard, FIG. 5 illustrates the operation of two UEs 12, which are referred to as UE-A and UE-B, and two base stations, which are referred to as BS-A and BS-B, according to some embodiments of the present disclosure. The operation of UE-A, UE-B, BS-A, and BS-B as described here provide a solution to the exposed node problem. In this example, the cellular communications network 10 is an LTE network such as an LTE network using LTE-U and/or LAA technology.

In the illustrated example, UE-A has an ongoing transmission in the unlicensed band (step 200A), and UE-A transmits a U-BUSY signal in the licensed band (step 200B). In this example, when UE-B detects the U-BUSY signal and senses the unlicensed channel busy, UE-B tries to decode the U-BUSY signal (step 202). Specifically, when decoding the U-BUSY signal, UE-B looks for the indication (e.g., cell identity) of the intended receiver of the transmission by UE-A in the unlicensed band. In some embodiments, UE-B also listens for a DL-U-BUSY signal from BS-B, which is its serving base station.

In this example, if UE-B can decode the indication of the intended receiver in the U-BUSY signal and/or does not detect a DL-U-BUSY signal from its serving base station, BS-B, then UE-B decides that it can transmit in the unlicensed channel because BS-B is not affected by UE-A's transmission.

In some embodiments, UE-B also continuously assess its own geometry with respect to BS-B (serving base station) and BS-A (neighboring base station) to estimate the interference level at neighboring base stations that its transmission would cause. Specifically, when UE-B decodes a U-BUSY signal and can decode an indication of the intended receiver of the respective transmission in the unlicensed spectrum, UE-B does not transmit if it assesses that it would cause packet collision at the intended receiver based on its geometry with respect to BS-B and BS-A.

Figure 6:
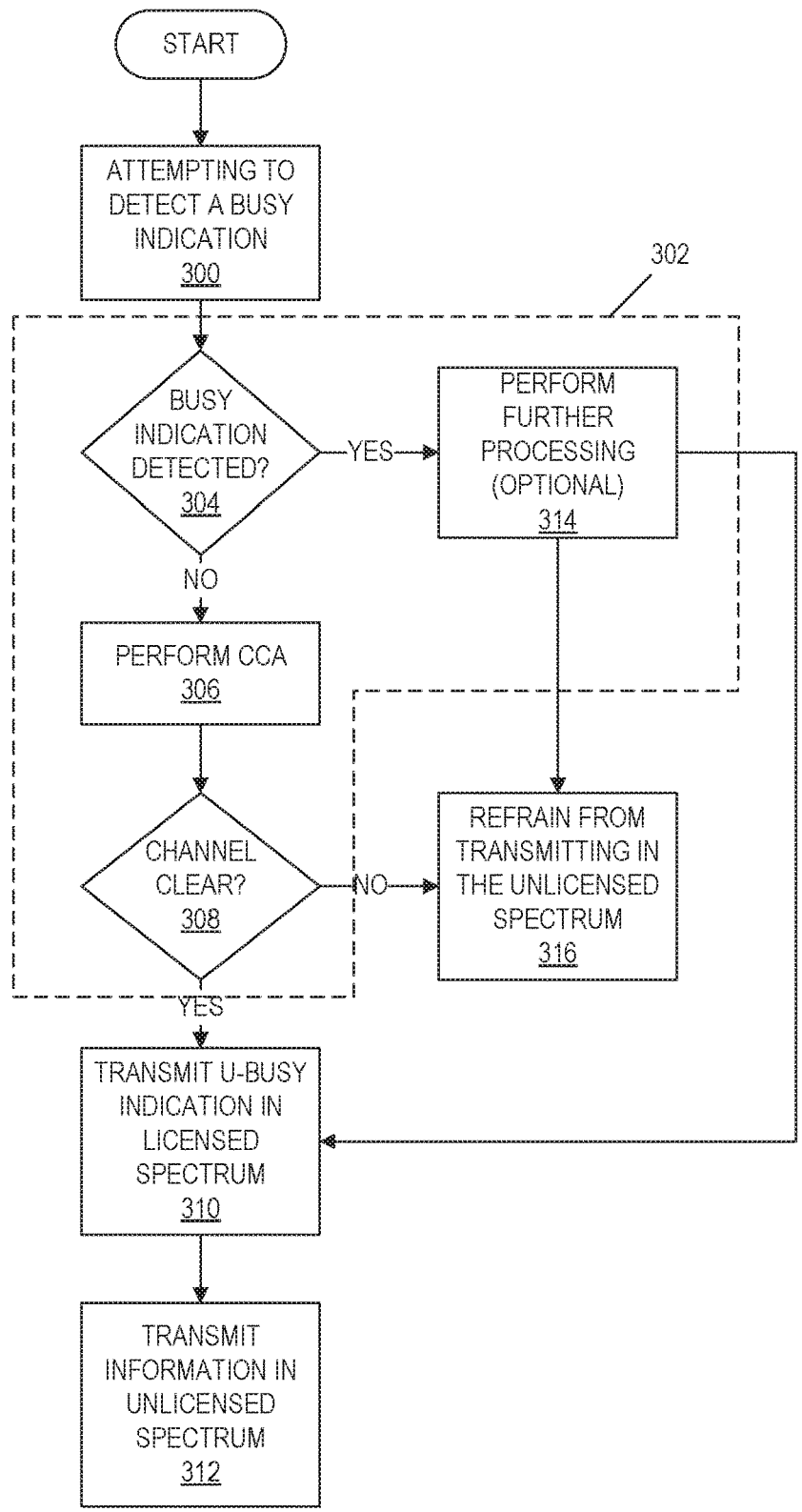
FIG. 6 is a flow chart that illustrates the operation of a wireless device according to some embodiments of the present disclosure.

FIG. 6 is a flow chart that illustrates the operation of a UE 12 according to some embodiments of the present disclosure. The operation of the UE 12 described with respect to FIG. 6 is a more detailed illustration of the operation of the UE 12 according at least some of the embodiments described above. As illustrated, when the UE 12 desires to transmit in the unlicensed spectrum, the UE 12 attempts to detect a busy indication in the licensed spectrum (step 300). In some embodiments, the UE 12 only attempts to detect a DL-U-BUSY signal transmitted in the licensed spectrum from its serving base station 14, i.e., the UE 12 does not attempt to detect a U-BUSY signal. In other embodiments, the UE 12 only attempts to detect a U-BUSY signal transmitted in the licensed spectrum by another UE 12, i.e., the UE 12 does not attempt to detect a DL-U-BUSY signal from its serving base station 14. In some other embodiments, the UE 12 attempts to detect both a DL-U-BUSY from its serving base station 14 and a U-BUSY signal transmitted by another UE 12. The UE 12 attempts to detect the busy indication by listening in the licensed spectrum for a DL-U-BUSY signal and/or a U-BUSY signal, depending on the embodiment.

The UE 12 determines whether to transmit in the unlicensed spectrum based on whether the UE 12 has detected a busy indication transmitted in the licensed spectrum (step 302). As discussed below, in some embodiments, the UE 12 determines, or decides, to transmit in the unlicensed spectrum upon: (a) determining that the UE 12 has not detected a busy indication transmitted in the licensed spectrum that indicates that an unlicensed channel(s) in the unlicensed spectrum on which the UE 12 desires to transmit is busy and (b) determining that the unlicensed channel(s) in the unlicensed spectrum on which the UE 12 desires to transmit is clear as a result of performing a CCA for the unlicensed channel(s). In some other embodiments, if the UE 12 detects a U-BUSY indication from another UE 12, the UE 12 determines to transmit in the unlicensed spectrum if the UE 12 does not also detect a DL-U-BUSY signal from its serving base station 14. In some other embodiments, if the UE 12 detects a U-BUSY signal from another UE 12, the UE 12 decodes the U-BUSY signal to obtain an indication of the intended recipient of the corresponding transmission in the unlicensed spectrum. If the intended recipient is not the same as the intended recipient for the desired transmission by the UE 12, then the UE 12 determines to transmit in the unlicensed spectrum.

In the illustrated example of step 302, the UE 12 determines whether a busy indication has been detected (step 304). If a busy indication has not been detected (step 304; NO), the UE 12 performs CCA for the unlicensed channel(s) on which it desires to transmit (step 306) and determines, based on the result of the CCA, whether the unlicensed channel(s) is clear (step 308). Note that performing CCA after not detecting a busy indication is beneficial because the UE 12 does not necessarily perform CCA unless a busy indication is not detected. If a busy indication is detected (step 304; YES), the UE 12 may not perform CCA, which in turn results in, e.g., less power and resource consumption at the UE 12. However, in some embodiments, the UE 12 may perform CCA before attempting to detect a busy indication or in parallel with attempting to detect a busy indication.

In this example, upon determining that a busy indication has not been detected and that the unlicensed channel(s) is clear (step 308; YES), the UE 12 determines to transmit on the unlicensed channel(s). As such, the UE 12 transmits a U-BUSY signal in the licensed spectrum that indicates that the UE 12 is transmitting in the unlicensed channel(s) (step 310) and starts transmitting on the unlicensed channel(s) in the unlicensed spectrum (step 312). Note that the UE 12 may transmit the U-BUSY signal either before or after initiating transmission in the unlicensed spectrum.

Returning to step 304, if a busy indication has been detected (step 304; YES), the UE 12 optionally performs further processing (step 314) and, depending on the outcome of the further processing, either proceeds to step 310 for transmission of the U-BUSY signal and transmission in the unlicensed spectrum or refrains from transmitting in the unlicensed spectrum (step 316). Note that if the further processing is not performed, upon detecting the busy indication, the UE 12 refrains from transmitting in the unlicensed spectrum (step 316). Likewise, at step 308, if the UE 12 has not detected a busy indication and the result of the CCA indicates that the unlicensed channel(s) are not clear (step 308; NO), then the UE 12 refrains from transmitting in the unlicensed spectrum (step 316).

Figure 7:
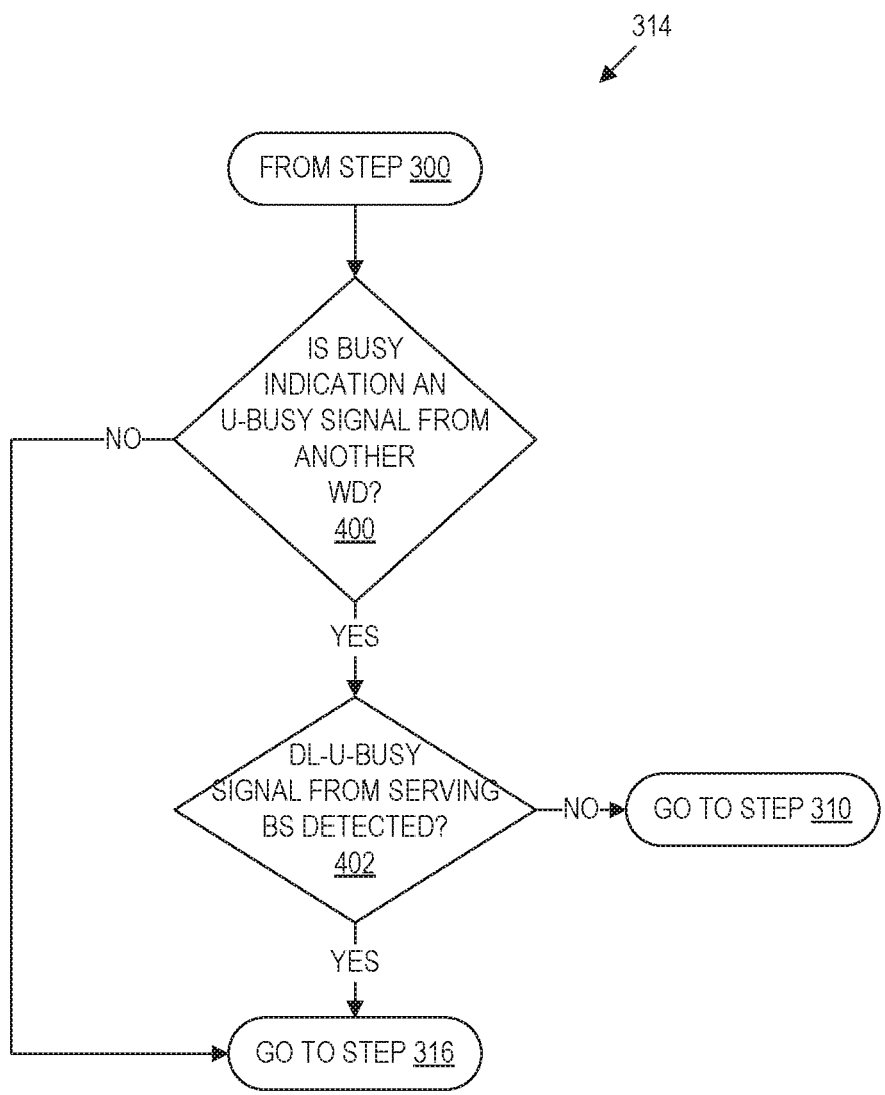
FIG. 7 illustrates one example of the further processing step in the flow chart of FIG. 6.
Figure 8:
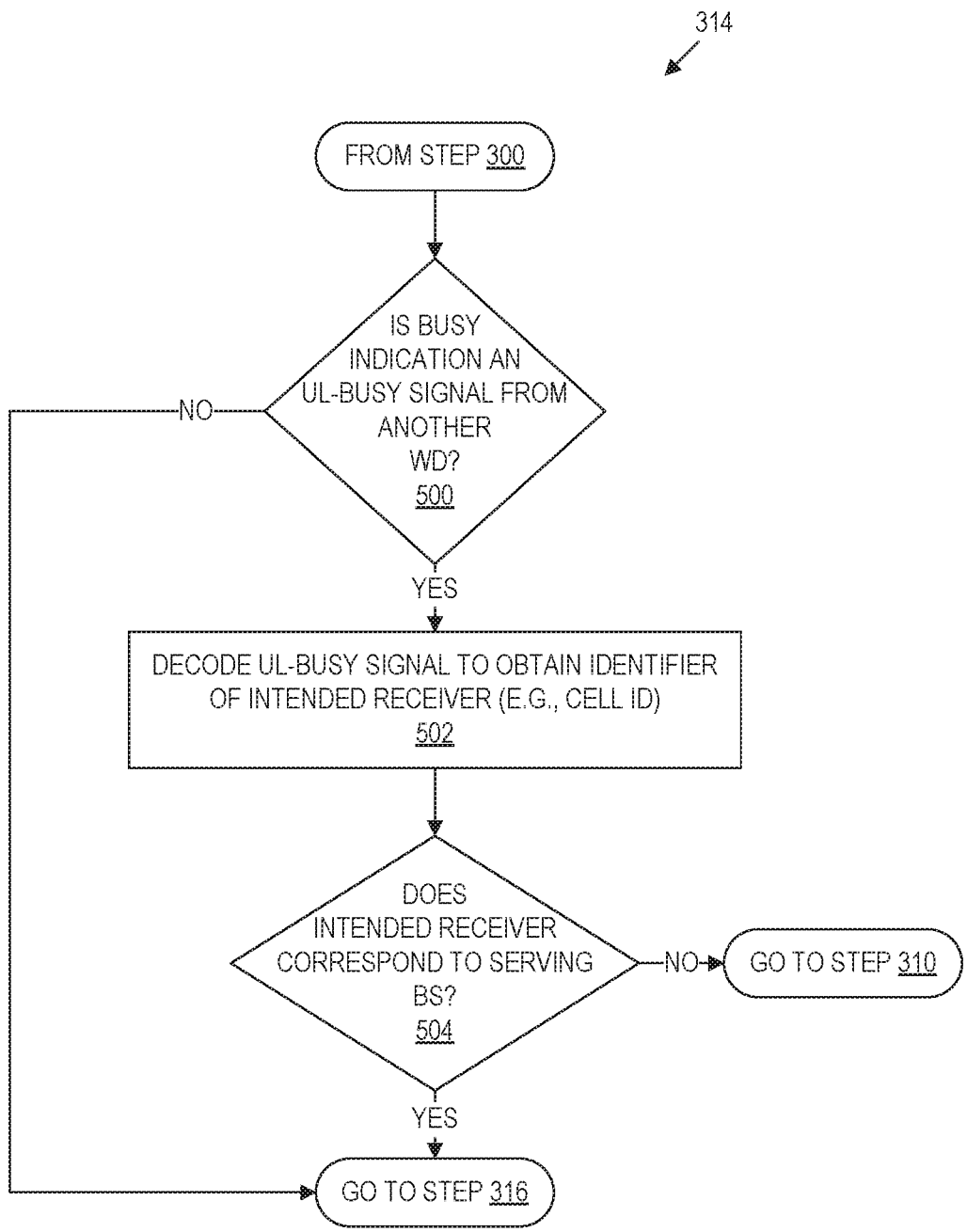
FIG. 8 illustrates another example embodiment of the further processing step in the flow chart of FIG. 6.

FIGS. 7 and 8 illustrate two example embodiments of the further processing in step 314. In the embodiment of FIG. 7, upon determining that a busy indication has been detected, the UE 12 determines whether the detected busy indication is a U-BUSY signal from another UE 12 (step 400). If not (i.e., if the detected busy indication is a DL-U-BUSY signal from its serving base station 14), the UE 12 proceeds to step 316 where the UE 12 refrains from transmitting in the unlicensed spectrum. However, if the detected busy indication is a U-BUSY signal from another UE 12, the UE 12 determines whether the UE 12 has also detected a DL-U-BUSY signal from its serving base station 14 (step 402). If so, the UE 12 proceeds to 316 where the UE 12 refrains from transmitting in the unlicensed spectrum. Conversely, if the UE 12 has not detected a DL-U-BUSY signal from its serving base station 14, the UE 12 has detected an exposed node scenario and, as such, the UE 12 proceeds to step 310 where the UE 12 transmits the U-BUSY signal and starts transmitting in the unlicensed spectrum since the UE 12 knows that its intended recipient is different than the intended recipient of the transmission corresponding to the detected U-BUSY signal.

The embodiment of FIG. 8 is similar to that of FIG. 7 but where the detected U-BUSY signal includes an indication of the intended recipient and the UE 12 is able to decode the U-BUSY signal. More specifically, upon determining that a busy signal has been detected, the UE 12 determines whether the detected busy indication is a U-BUSY signal from another UE 12 (step 500). If not (i.e., if the detected busy indication is a DL-U-BUSY signal from its serving base station 14), the UE 12 proceeds to step 316 where the UE 12 refrains from transmitting in the unlicensed spectrum. However, if the detected busy indication is a U-BUSY signal from another UE 12, the UE 12 decodes the U-BUSY signal to obtain the indication, or identifier, of the intended recipient of the corresponding transmission in the unlicensed spectrum (step 502). Based on the obtained indication of the intended recipient, the UE 12 determines whether the intended recipient indicated in the U-BUSY signal corresponds to its serving base station 14 (step 504). In other words, the UE 12 determines whether the intended recipient indicated in the U-BUSY signal is the same as the intended recipient of the desired transmission by the UE 12. If not, the UE 12 has detected an exposed node scenario and, as such, the UE 12 proceeds to step 310 where the UE 12 transmits the U-BUSY signal and starts transmitting in the unlicensed spectrum since the UE 12 knows that its intended recipient is different than the intended recipient of the transmission corresponding to the detected U-BUSY signal. Otherwise, the UE 12 proceeds to step 316 where the UE 12 refrains from transmitting in the unlicensed spectrum.

The U-BUSY and DL-U-BUSY signals described above can be carried out in several different ways. In some embodiments, they are transmitted in the licensed uplink band and the licensed downlink band of the cellular communications network 10, respectively. However, the transmission of U-BUSY from the UE 12 can, according to some embodiments, take place in any licensed band using any physical channel where the UE 12 is allowed to transmit, and a similar arrangement can be considered for the DL-U-BUSY signal. As a non-limiting example, the UE 12 may transmit the U-BUSY signal utilizing time/frequency resources designated for D2D traffic, for example following the Sidelink feature specified in 3GPP. These D2D resources may partly coincide with the uplink or the downlink band, or occupy separate frequency ranges.

The messages conveyed by the U-BUSY and DL-U-BUSY signals can be encoded in several possible ways. For example, they may utilize existing mechanisms for transmission of Uplink Control Information (UCI) and Downlink Control Information (DCI). In some embodiments where the underlying cellular network is a 3GPP LTE network, the U-BUSY signal is transmitted on the LTE Physical Uplink Control Channel (PUCCH). The U-BUSY signal may use an existing PUCCH format in which the U-BUSY signal has been encoded such that it is different from existing UCI messages, or it may use a newly defined PUCCH format. Alternatively, the U-BUSY signal is transmitted using an existing physical D2D channel, e.g. a LTE Sidelink Channel. Similarly, the DL-U-BUSY signal may be transmitted on one of the existing LTE downlink control channels (i.e., the Physical Downlink Control Channel (PDCCH), the enhanced PDCCH (ePDCCH), or MTC PDCCH (MPDCCH)), either reusing one of the existing DCI formats or using a newly defined DCI format. If the underlying cellular network is not an LTE network but, e.g., a New Radio (NR) technology as part of a 5G framework, the corresponding physical channels may differ from the ones mentioned above, but the same principle may be followed.

As an alternative, the U-BUSY and DL-U-BUSY signals may be transmitted on newly defined physical channels with time/frequency resources that may be separate from the existing uplink, D2D (e.g., Sidelink), and/or downlink channels. As yet another alternative, the U-BUSY and DL-U-BUSY signals are transmitted as higher layer control signaling using, e.g., Radio Resource Control (RRC) signaling.

As mentioned above, the U-BUSY and DL-U-BUSY signals may comprise information of different levels of detail. In their simplest form, they may only contain a single binary value signaling that an unlicensed resource (i.e., an unlicensed channel) is occupied, in which case all UEs 12 and base stations 14 using the concepts disclosed herein must know which resource this refers to. When there are several unlicensed channels in one or more unlicensed band, the messages may contain information about which one(s) of the channels are occupied. This can be done with some explicit reference to radio resources using, e.g., a bandwidth and some evolved Universal Mobile Telecommunications System (UMTS) Terrestrial Radio Access (E-UTRA) Absolute Radio Frequency Channel Number (EARFCN) or similar indicator, or it can be done implicitly with reference to one or more radio resources that have been preconfigured using, e.g., broadcasted system information or dedicated RRC signaling. Furthermore, according to some of the embodiments described above, the messages may also include an indication of the intended receiver, e.g., a cell identity corresponding to a particular base station 14, which can, e.g., be encoded as a full cell identity or as one of an enumerated list of currently configured base stations. Similarly, the messages can contain other information such as some UE identity which can be used, e.g., to allow for simultaneous transmission of different U-BUSY signals from different UEs 12, and allowing the base station(s) 14 and other UE(s) 12 to decode such multiple simultaneous messages.

The different pieces of information contained in messages conveyed by the U-BUSY and DL-U-BUSY signals described above can be encoded in several possible ways. This includes, but is not limited to:

explicitly including the information content in the message, encoding the information using different constellation points and/or one out of several signatures that is explicitly included in the message, scrambling the message with a signature determined by the information content, and scrambling a Cyclic Redundancy Check (CRC) with a signature determined by the information content.

The above techniques may be used separately or combined, common to or separate between the different information content.

Figure 9:
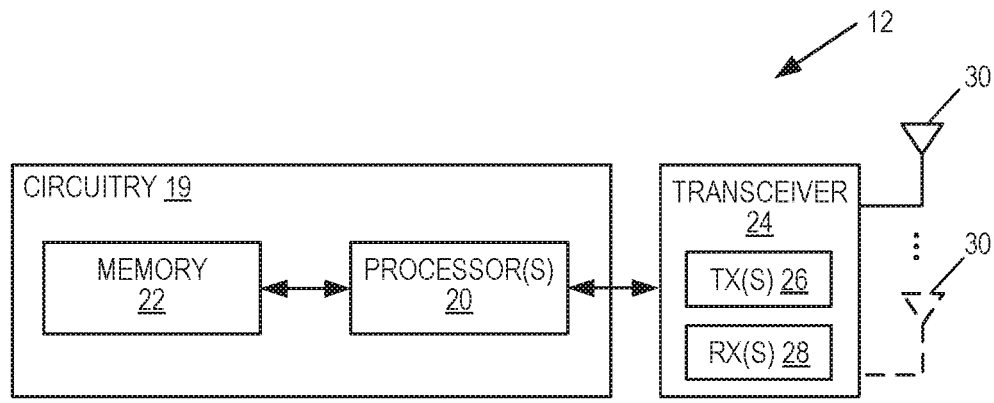
FIGS. 9 and 10 are block diagrams of a wireless device according to some embodiments of the present disclosure.

FIG. 9 is a schematic block diagram of the UE 12, or more generally a wireless device which may also be referred to herein as a wireless device 12, according to some embodiments of the present disclosure. As illustrated, the UE 12 includes circuitry 19 comprising one or more processors 20 (e.g., Central Processing Units (CPUs), Application Specific Integrated Circuits (ASICs), Field Programmable Gate Arrays (FPGAs), and/or the like) and memory 22. The UE 12 also includes one or more transceivers 24 each including one or more transmitters 26 and one or more receivers 28 coupled to one or more antennas 30. In some embodiments, the functionality of the UE 12 described above may be fully or partially implemented in software that is, e.g., stored in the memory 22 and executed by the processor(s) 20.

In some embodiments, a computer program including instructions which, when executed by at least one processor, causes the at least one processor to carry out the functionality of the UE 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 10:
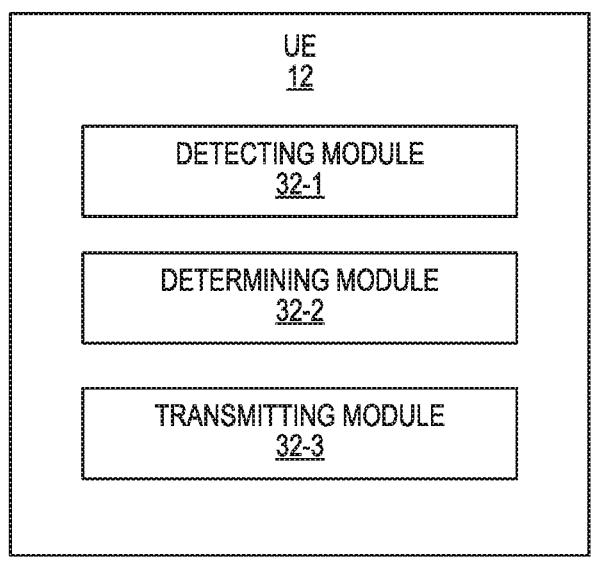

FIG. 10 is a schematic block diagram of the UE 12, or more generally a wireless device which may also be referred to herein as a wireless device 12, according to some other embodiments of the present disclosure. The UE 12 includes one or more modules 32, each of which is implemented in software. The module(s) 32 provide the functionality of the wireless device 12 (e.g., UE) described herein. In this example, the UE 12 includes a detecting module 32-1 operable to attempt to detect a busy indication transmitted in the licensed spectrum, a determining module 32-2 operable to determine whether to transmit in the unlicensed spectrum based on whether the UE 12 has detected a busy indication transmitted in the licensed spectrum, and a transmitting module 32-3 operable to, upon determining to transmit in the unlicensed spectrum, transmit in the unlicensed spectrum.

Figure 11:
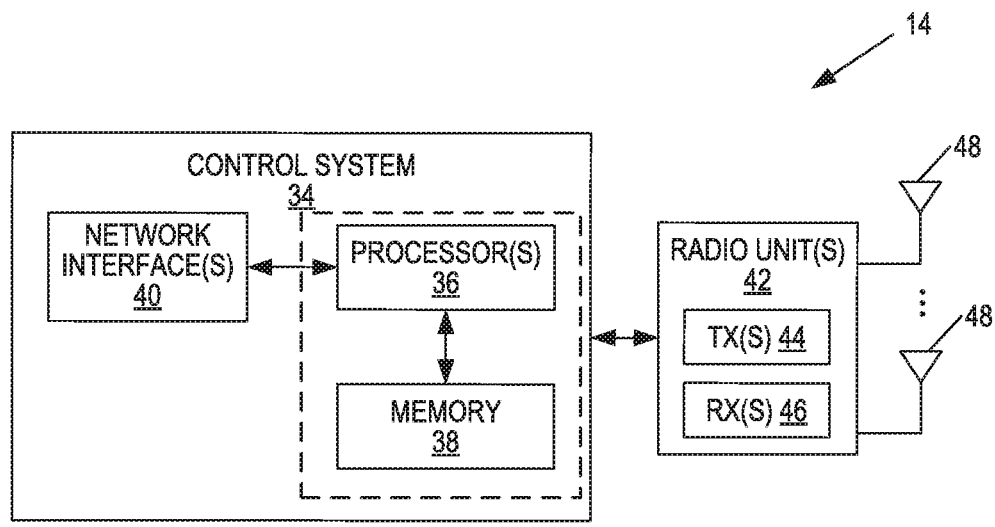
FIGS. 11 through 13 are block diagram of a radio access node according to some embodiments of the present disclosure.

FIG. 11 is a schematic block diagram of the base station 14, or more generally a radio access node which is also referred to herein as a radio access node 14, according to some embodiments of the present disclosure. Other types of network nodes may have similar architectures, particularly with respect to including processor(s), memory, and a network interface. As illustrated, the base station 14 includes a control system 34 that includes circuitry comprising one or more processors 36 (e.g., CPUs, ASICs, FPGAs, and/or the like) and memory 38. The control system 34 also includes a network interface 40. The base station 14 also includes one or more radio units 42 that each includes one or more transmitters 44 and one or more receivers 46 coupled to one or more antennas 48. In some embodiments, the functionality of the base station 14 described above may be fully or partially implemented in software that is, e.g., stored in the memory 38 and executed by the processor(s) 36.

Figure 12:
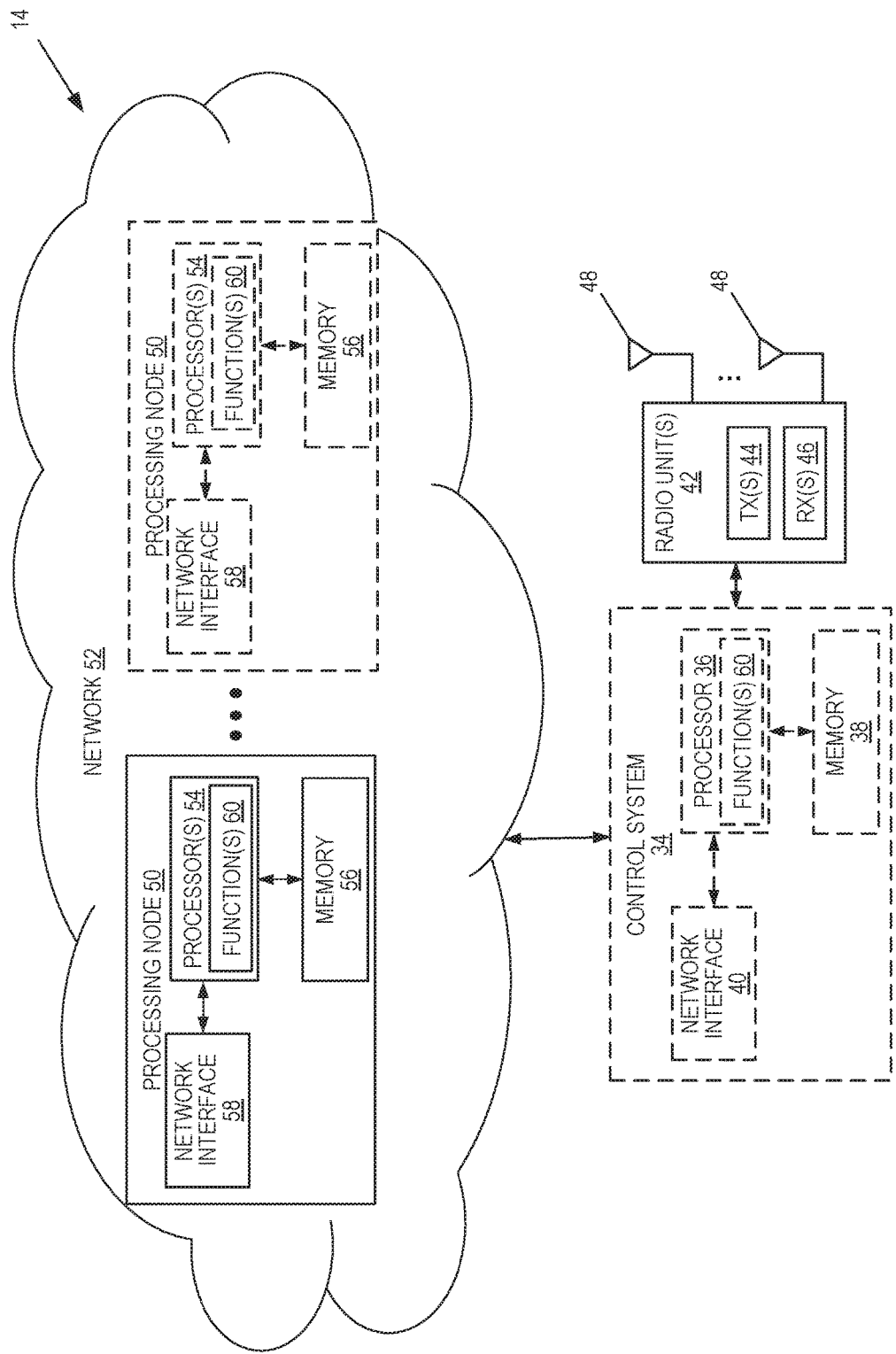

FIG. 12 is a schematic block diagram that illustrates a virtualized embodiment of the base station 14 according to some embodiments of the present disclosure. Other types of network nodes may have similar architectures (particularly with respect to including processor(s), memory, and a network interface).

As used herein, a "virtualized" base station 14 is a base station 14 in which at least a portion of the functionality of the base station 14 is implemented as a virtual component (e.g., via a virtual machine(s) executing on a physical processing node(s) in a network(s)). As illustrated, the base station 14 optionally includes the control system 34, as described with respect to FIG. 11. The base station 14 also includes the one or more radio units 42 that each includes the one or more transmitters 44 and the one or more receivers 46 coupled to the one or more antennas 48, as described above. The control system 34 (if present) is connected to the radio unit(s) 42 via, for example, an optical cable or the like. The control system 34 (if present) is connected to one or more processing nodes 50 coupled to or included as part of a network(s) 52 via the network interface 40. Alternatively, if the control system 34 is not present, the one or more radio units 42 are connected to the one or more processing nodes 50 via a network interface(s). Each processing node 50 includes one or more processors 54 (e.g., CPUs, ASICs, FPGAs, and/or the like), memory 56, and a network interface 58.

In this example, functions 60 of the base station 14 described herein are implemented at the one or more processing nodes 50 or distributed across the control system 34 (if present) and the one or more processing nodes 50 in any desired manner. In some particular embodiments, some or all of the functions 60 of the base station 14 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 is used in order to carry out at least some of the desired functions. Notably, in some embodiments, the control system 34 may not be included, in which case the radio unit(s) 42 communicate directly with the processing node(s) 50 via an appropriate network interface(s).

In some embodiments, a computer program including instructions which, when executed by at least one processor, causes the at least one processor to carry out the functionality of the base station 14 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 13:
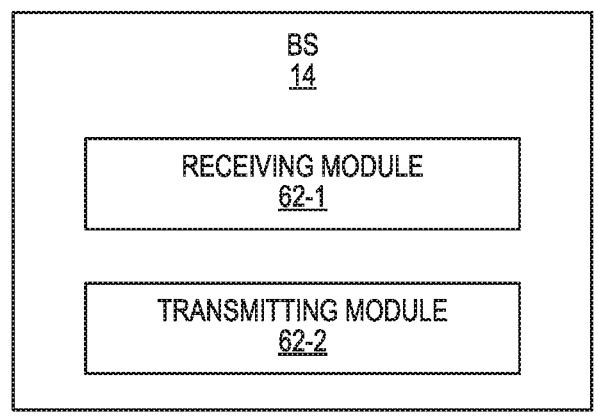

FIG. 13 is a schematic block diagram of the base station 14, or more generally a radio access node which is also referred to herein as a radio access node 14, according to some other embodiments of the present disclosure. The base station 14 includes one or more modules 62, each of which is implemented in software. The module(s) 62 provide the functionality of the radio access node 14 described herein. In this example, the base station 14 includes a receiving module 62-1 operable to receive a first busy indication in a licensed spectrum from a wireless device 12, where the first busy indication is an indication that the wireless device 12 is transmitting in an unlicensed spectrum. In this example, the base station 14 also includes a transmitting module 62-2 operable to transmit a second busy indication in a licensed spectrum indication in response to receiving the first busy indication, where the second busy indication is an indication that the wireless device 12 is transmitting in an unlicensed spectrum.

While not being limited thereto, some exemplary advantages of embodiments disclosed herein include:

Embodiments disclosed herein takes advantage of the availability of a licensed spectrum of a cellular communications network to help avoid the hidden node and exposed node problems of LBT and CSMA protocols operating in the unlicensed spectrum;

Embodiments disclosed herein increase the throughput and stability that can be achieved in the unlicensed spectrum; and Embodiments disclosed herein improve the utilization of unlicensed spectrum as compared with systems using existing technology to control the medium access of unlicensed resources.

The following acronyms are used throughout this disclosure.

3GPP Third Generation Partnership Project
5G Fifth Generation
AoA Angle of Arrival
ASIC Application Specific Integrated Circuit
CA Carrier Aggregation
CCA Clear Channel Assessment
CN Core Network
CPU Central Processing Unit
CRC Cyclic Redundancy Check
CS Carrier Sensing
CSMA Carrier Sense Multiple Access
CTS Clear to Send
D2D Device-to-Device
dBm Decibel-Milliwatt
DCI Downlink Control Information
EARFCN Evolved Universal Mobile Telecommunications System Terrestrial Radio Access Absolute Radio Frequency Channel Number
eNB Enhanced or Evolved Node B
ePDCCH Enhanced Physical Downlink Control Channel
E-UTRA Evolved Universal Mobile Telecommunications System Terrestrial Radio Access
FPGA Field Programmable Gate Array
LAA License Assisted Access
LBT Listen-Before-Talk
LTE Long Term Evolution
LTE-U Long Term Evolution in the Unlicensed Band
MAC Medium Access Control
MME Mobility Management Entity
MPDCCH Machine Type Communication Physical Downlink Control Channel
MTC Machine Type Communication
multi-RAT Multiple Radio Access Technology
NR New Radio
PCell Primary Cell
PDCCH Physical Downlink Control Channel
PDN Packet Data Network
P-GW Packet Data Network Gateway
PUCCH Physical Uplink Control Channel
RRC Radio Resource Control
RTS Ready to Send
SCEF Service Capability Exposure Function
SCell Secondary Cell
UCI Uplink Control Information
UE User Equipment
UMTS Universal Mobile Telecommunications System Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a wireless system in which the wireless device transmits and/or receives in both a licensed spectrum and an unlicensed spectrum, comprising:
    attempting to detect a busy indication transmitted in the licensed spectrum, the busy indication being an indication that another wireless device is transmitting in the unlicensed spectrum;
    determining whether to transmit in the unlicensed spectrum based on whether the wireless device has detected a busy indication transmitted in the licensed spectrum; and
    upon determining to transmit in the unlicensed spectrum, transmitting a busy indication in an uplink channel in an uplink spectrum of a cellular communications network, the cellular communications network comprising a serving radio access node of the wireless device.

2. The method of claim 1 further comprising, upon determining to transmit in the unlicensed spectrum, transmitting in the unlicensed spectrum.

3. The method of claim 1 wherein attempting to detect a busy indication transmitted in the licensed spectrum comprises attempting to detect a busy indication transmitted in the licensed spectrum by a serving radio access node of the wireless device.

4. The method of claim 1 wherein attempting to detect a busy indication transmitted in the licensed spectrum comprises attempting to detect a busy indication transmitted in the licensed spectrum by another wireless device.

5. The method of claim 1 further comprising:
    performing a clear channel assessment for a channel in the unlicensed spectrum;
    wherein determining whether to transmit in the unlicensed spectrum comprises determining to transmit in the unlicensed spectrum upon determining that the wireless device has not detected a busy indication transmitted in the licensed spectrum and determining that the channel in the unlicensed spectrum is clear as a result of performing the clear channel assessment for the channel in the unlicensed spectrum.

6. The method of claim 1 wherein transmitting the busy indication comprises transmitting the busy indication using a scheduled resource in the licensed spectrum.

7. The method of claim 1 wherein transmitting the busy indication comprises transmitting the busy indication using a preconfigured channel in the licensed spectrum.

8. The method of claim 1 wherein transmitting the busy indication comprises transmitting the busy indication using resources designated for device-to-device traffic.

9. The method of claim 1 wherein the transmitted busy indication is a message comprising an indication of a resource in the unlicensed spectrum on which the wireless device is transmitting.

10. The method of claim 1 wherein the unlicensed spectrum is logically divided into a plurality of channels, and the transmitted busy indication is a message comprising an indication of one or more channels in the unlicensed spectrum in which the wireless device is transmitting.

11. The method of claim 1 wherein the transmitted busy indication is a message comprising an indication of an intended recipient of the transmission by the wireless device in the unlicensed spectrum.

12. A method of operation of a wireless device in a wireless system in which the wireless device transmits and/or receives in both a licensed spectrum and an unlicensed spectrum, comprising:
attempting to detect a busy indication transmitted in the licensed spectrum, the busy indication being an indication that another wireless device is transmitting in the unlicensed spectrum, wherein attempting to detect a busy indication transmitted in the licensed spectrum comprises attempting to detect both a busy indication transmitted in the licensed spectrum by a serving radio access node of the wireless device and a busy indication transmitted in the licensed spectrum by another wireless device; and
determining whether to transmit in the unlicensed spectrum based on whether the wireless device has detected a busy indication transmitted in the licensed spectrum.

13. A method of operation of a wireless device in a wireless system in which the wireless device transmits and/or receives in both a licensed spectrum and an unlicensed spectrum, comprising:
attempting to detect a busy indication transmitted in the licensed spectrum, the busy indication being an indication that another wireless device is transmitting in the unlicensed spectrum; and
determining whether to transmit in the unlicensed spectrum based on whether the wireless device has detected a busy indication transmitted in the licensed spectrum, wherein determining whether to transmit in the unlicensed spectrum based on whether the wireless device has detected a busy indication transmitted in the licensed spectrum comprises:
determining that the wireless device has detected a busy indication transmitted in the licensed spectrum;
determining that the detected busy indication is a busy indication transmitted in the licensed spectrum by another wireless device; and
determining whether the wireless device has also detected a busy indication transmitted in the licensed spectrum by a serving radio access node of the wireless device;
wherein the wireless device determines to transmit in the unlicensed spectrum upon determining that the wireless device has not also detected a busy indication transmitted in the licensed spectrum by the serving radio access node of the wireless device.

14. A method of operation of a wireless device in a wireless system in which the wireless device transmits and/or receives in both a licensed spectrum and an unlicensed spectrum, comprising:
attempting to detect a busy indication transmitted in the licensed spectrum, the busy indication being an indication that another wireless device is transmitting in the unlicensed spectrum; and
determining whether to transmit in the unlicensed spectrum based on whether the wireless device has detected a busy indication transmitted in the licensed spectrum, wherein determining whether to transmit in the unlicensed spectrum based on whether the wireless device has detected a busy indication transmitted in the licensed spectrum comprises:
determining that the wireless device has detected a busy indication transmitted in the licensed spectrum;
determining that the detected busy indication is a busy indication transmitted in the licensed spectrum by another wireless device;
decoding the busy indication to obtain an identifier of an intended recipient of the transmission in the unlicensed spectrum by the other wireless device; and
determining whether the intended recipient is a serving radio access node of the wireless device;
wherein the wireless device determines to transmit in the unlicensed spectrum upon determining that the intended recipient is not the serving radio access node of the wireless device.

15. A wireless device for a wireless system in which the wireless device transmits and/or receives in both a licensed spectrum and an unlicensed spectrum, comprising:
a transceiver;
at least one processor; and
memory comprising instructions executable by the at least one processor whereby the wireless device is operable to:
attempt to detect a busy indication transmitted in the licensed spectrum, the busy indication being an indication that another wireless device is transmitting in the unlicensed spectrum;
determine whether to transmit in the unlicensed spectrum based on whether the wireless device has detected a busy indication transmitted in the licensed spectrum; and
upon determining to transmit in the unlicensed spectrum, transmit a busy indication in an uplink channel in an uplink spectrum of a cellular communications network, the cellular communications network comprising a serving radio access node.

16. A method of operation of a radio access node in a wireless system, comprising:
receiving a first busy indication in an uplink channel in an uplink spectrum of a wireless network from a wireless device, the first busy indication being an indication that the wireless device is transmitting in an unlicensed spectrum; and
transmitting a second busy indication in a licensed spectrum indication in response to receiving the first busy indication, the second busy indication being an indication that the wireless device is transmitting in the unlicensed spectrum.

17. The method of claim 16 wherein the second busy indication comprises at least one of a group consisting of: a parameter that is indicative of a validity of the second busy indication, an indication of an angle of arrival of the first busy indication at a radio network node, and an indication of one or more channels in the unlicensed spectrum in which the wireless device is transmitting.

18. The method of claim 16 wherein the first busy indication comprises at least one of a group consisting of: an indication of a resource in the unlicensed spectrum on which the wireless device is transmitting, an indication of one or more channels in the unlicensed spectrum in which the wireless device is transmitting, and an indication of an intended recipient of the transmission by the wireless device in the unlicensed spectrum.

19. The method of claim 16 wherein transmitting the second busy indication comprises transmitting the second busy indication using a scheduled resource in the licensed spectrum.

20. The method of claim 16 wherein transmitting the second busy indication comprises transmitting the second busy indication using a preconfigured channel in the licensed spectrum.

21. The method of claim 16 wherein transmitting the second busy indication comprises transmitting the second busy indication in a downlink channel in a downlink spectrum of a cellular communications network, the cellular communications network comprising the radio access node.

22. A radio access node for a wireless system, comprising:
at least one radio unit;
at least one processor; and
memory comprising instructions executable by the at least one processor whereby the radio access node is operable to:
receive a first busy indication in an uplink channel in an uplink spectrum of a wireless network from a wireless device, the first busy indication being an indication that the wireless device is transmitting in an unlicensed spectrum; and
transmit a second busy indication in a licensed spectrum indication in response to receiving the first busy indication, the second busy indication being an indication that the wireless device is transmitting in an unlicensed spectrum.

* * * * *